United States Patent [19]
Pals

[11] 3,861,359
[45] Jan. 21, 1975

[54] HOG SORTER GATE DEVICE

[76] Inventor: Robert Pals, R.R. No. 1, Teutopolis, Ill. 62467

[22] Filed: Jan. 9, 1974

[21] Appl. No.: 431,863

[52] U.S. Cl. .............................................. 119/155
[51] Int. Cl............................................. A01k 29/00
[58] Field of Search............................. 119/155, 157

[56] References Cited
UNITED STATES PATENTS

| | | | |
|---|---|---|---|
| 2,930,353 | 3/1960 | Sievers | 119/155 |
| 3,072,100 | 1/1963 | Dustin | 119/155 |
| 3,797,463 | 3/1974 | McCrery, Jr. | 119/155 |

Primary Examiner—Louis G. Mancene
Assistant Examiner—J. N. Eskovitz

[57] ABSTRACT

A hog sorter gate device intended to be placed between two pens and which is selectably adjustable in size so as to permit hogs of the selected size or smaller to pass freely therethrough from one pen into the adjacent pen while preventing all larger hogs from passing therethrough so as to retain all of the selected size larger hogs in a single pen, with there being included a pivoted swinging gate associated with the opening in a manner to swing out of the way in one direction to permit such hogs to pass therethrough and which prevents such hogs from returning through the gate after once having passed therethrough. The device includes a pair of uprights which are adjustable in horizontal spacing therebetween for selected sizing of the gate opening, and a gate member swingably pivoted to a horizontal supporting member for pivoting movement thereabout to permit one-way passage of hogs therethrough.

1 Claim, 7 Drawing Figures

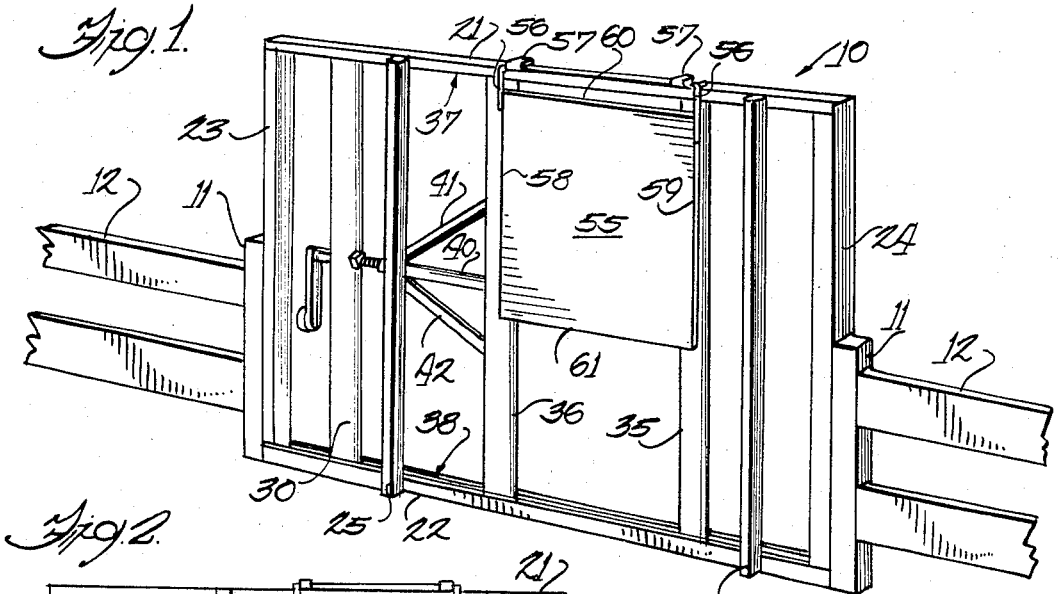
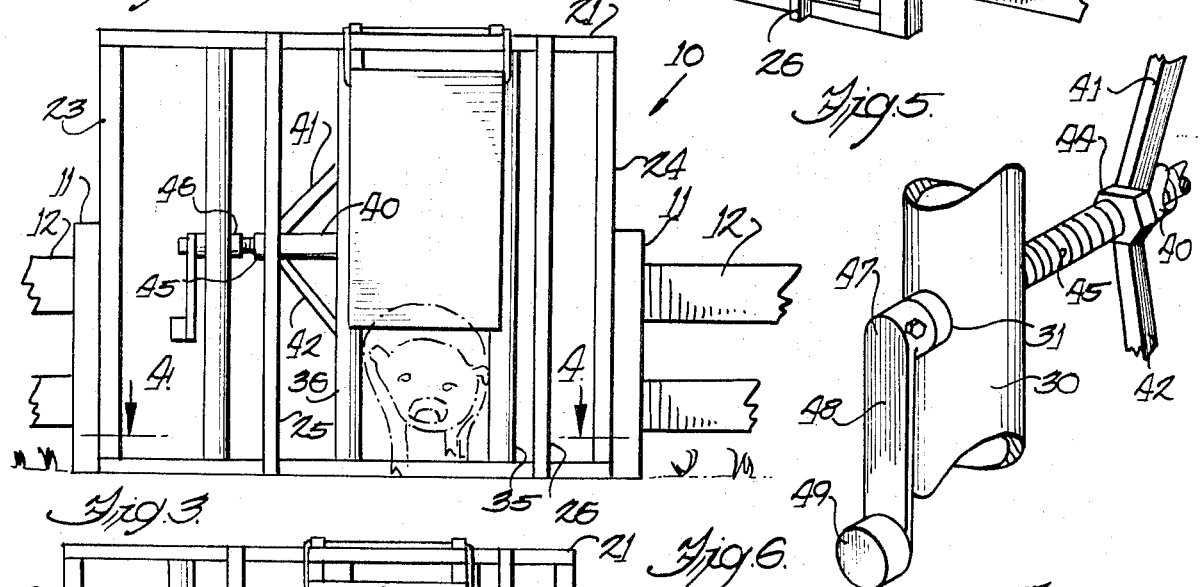
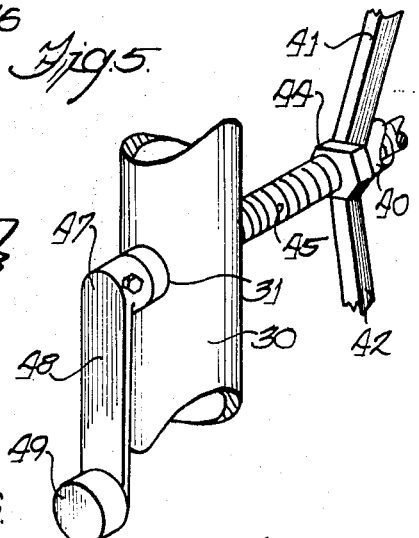
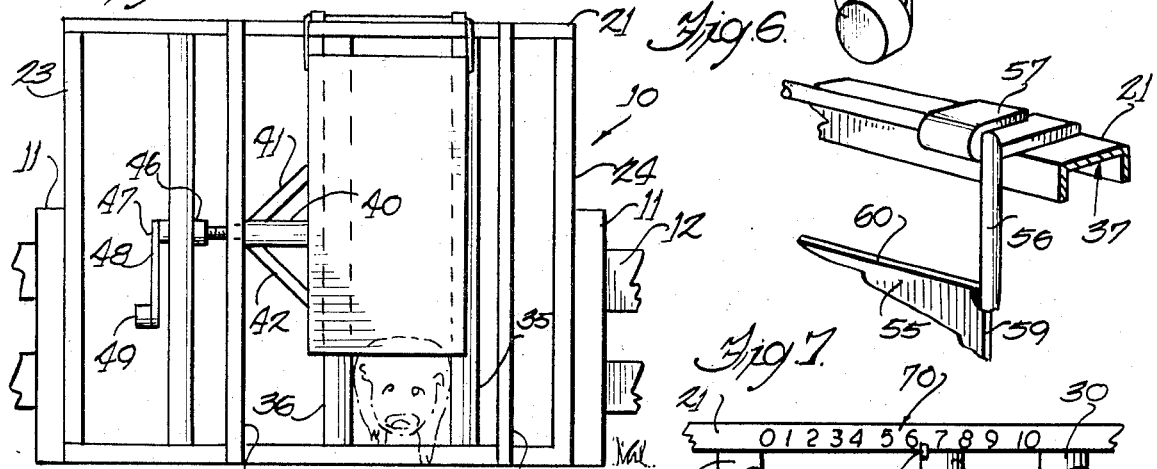
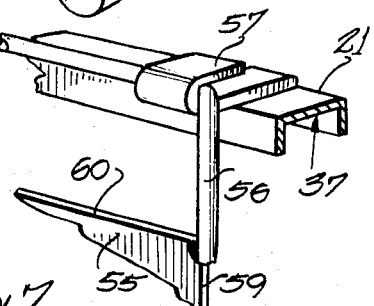
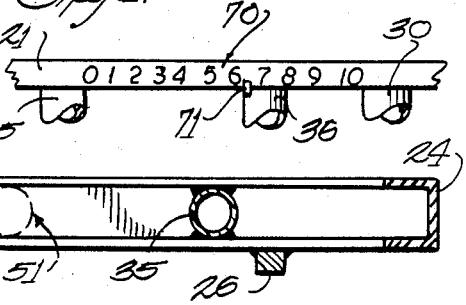
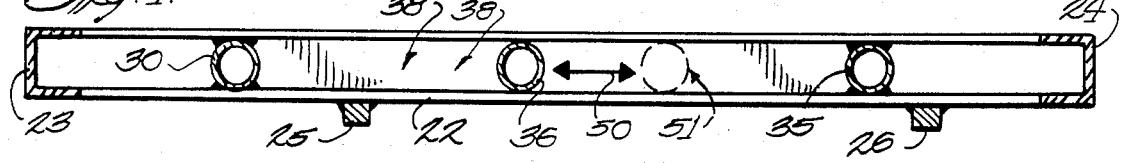

HOG SORTER GATE DEVICE

BACKGROUND OF THE INVENTION

1. Field of the Invention

This invention relates generally to sorting devices and more particularly to a novel hog sorter gate device intended for use in the sorting, classifying and separating of hogs according to size and therefore according to weight.

2. Description of the Prior Art

In the raising and marketing of hogs it is necessary to group all hogs according to a certain general weight when ready for marketing. For example, if an individual wishes to market hogs at or around 215 pounds for each hog, or at any other selected weight, it is necessary to sort through the herd of hogs to separate out all hogs of the desired weight for the marketing of the same. In other words, the problem presented to the individual is that of picking out the hogs in the selected weight class for marketing.

Presently this is accomplished by the time consuming and laborious process of sorting through the herd and having to weigh ones of the herd which appear to be of the proper size, and then physically moving each selected individual hog from the herd to a separate pen for later taking the hogs to market.

SUMMARY OF THE INVENTION

The present invention recognizes the difficulties encountered in having to physically catch, weigh and move individual hogs from the general herds to respective pens for marketing, and provides a novel solution for the sorting of hogs according to size and therefore according to weight in the form of an adjustable gate which may be selectively adjusted for a desired size of opening therethrough and placed in the normal conventional gate opening of a pen in a manner to retain in the pen hogs at or above the size of the opening while simultaneously allowing hogs of a size to pass through the opening to escape, these being the smaller hogs. Thus, by proper adjustment of the size of the opening and a general knowledge of the weight of a hog according to its size, proper weight grouping within relatively narrow limits may be readily accomplished.

It is a feature of the present invention to provide a hog sorting gate device which somewhat automatically affects the sorting of hogs according to size and weight thereof.

A further feature of the present invention provides a hog sorting gate device which is relatively simple in its construction and which therefore may be readily manufactured at a relatively low cost and by simple manufacturing methods.

Still a further feature of the present invention provides a hog sorting gate device which is possessed of few parts and which therefore is unlikely to get out of order.

Yet still a further feature of the present invention provides a hog sorting gate device which is of a rugged and durable construction and which therefore may be guaranteed by the manufacturer to withstand rough usage.

Yet still a further feature of the present invention provides a hog sorting gate device which is easy to use and reliable and efficient in operation.

Other features and advantages of this invention will be apparent during the course of the following description.

BRIEF DESCRIPTION OF THE DRAWINGS

In the accompanying drawings forming a part of this specification, and in which like reference characters are employed to designate like parts throughout the same:

FIG. 1 is a perspective view of a hog sorting gate device of the present invention mounted in the conventional gate opening of a pen;

FIG. 2 is a front elevational view of the soring gate adjusted for one size of a hog;

FIG. 3 is a front elevational view similar to FIG. 2 but with the gate adjusted for a smaller size of a hog;

FIG. 4 is a cross-sectional view taken along line 4—4 of FIG. 2;

FIG. 5 is a fragmentary perspective view of a portion of the adjusting mechanism;

FIG. 6 is a fragmentary perspective view of a portion of the pivot mechanism which pivotally secures the gate for one-way movement above the gate opening; and FIG. 7 is a fragmentary front elevational view of marking indicia on the top of the gate and pointer means for indicating the relative width of the gate opening for ease in selecting the desired gate opening size.

DESCRIPTION OF THE PREFERRED EMBODIMENT

Referring now to the drawings in detail there is illustrated a preferred form of a hog sorting gate device constructed in accordance with the principles of the present invention and designated generally in its entirety by the reference numeral 10 and is shown in a preferred operating position temporarily connected to the end posts 11 of a fence 12 separating adjacent hog pens or the like in a manner to control the movement of hogs therebetween.

The device 10 is comprised of a rectangular frame formed of a top horizontal member 21, a bottom horizontal member 22, and a pair of horizontally spaced apart vertically extending side members 23 and 24, the top members each being of a U-shaped channel member with the channels thereof disposed in confronting relationship. To assist in rigidifying the frame there are provided a pair of vertically disposed uprights 25 and 26 interconnecting top and bottom members 21 and 22. Further, disposed within the plane of the frame and extending between the confronting channels of the top and bottom members 21 and 22 is a vertical post 30 having a diametrically extending opening 31 disposed approximately midway between the top and bottom members and extending therethrough in the plane of the frame. The post 30 is disposed adjacent side member 23.

Defining one side of the gate opening is a vertical side rail 35 which extends into the confronting channels of the top and bottom members 21 and 22 and is secured thereto in any suitable manner, such as by welding or the like. Spaced horizontally from the fixed vertical side rail 35 is a movable vertically disposed side rail 36 which has its opposite end portions guided for horizontal movement in the channels 37 and 38 of the top and bottom members 21 and 22 respectively. The side rail 36 is provided with a radially extending tubular member 40 disposed in alignment with opening 31 in post 30 and which is provided with angular braces 41 and 42 which extend from the outer end 43 of the tube in upward and downward diverging directions therefrom to be connected to the side rail 36, this all being within the plane of the frame. A threaded nut 44 is weldingly affixed to the tube end 43 in axial alignment therewith and threadedly receives therein a threaded shank 45 which extends therefrom through a suitable bushing 46 in post opening 31 to terminate at an end 47 of an operating lever 48 which projects radially from the axis of the shank and terminates in a handle portion 49, the handle being operative in a manner to effect the rotation of the shank about its axis with rotation in one direction effecting the inward movement of the side rail 36 relative to fixed side rail 35 and with rotation in the opposite direction effecting the outward movement of movable side rail 36 relative to fixed rail 35, this thus adjustably setting the width of the opening between the side rails through which the hogs may pass.

In this regard it is to be noted that the vertical uprights 25 and 26 are positioned on the frame along with the fixed side rail 35 and fixed post 30 in a manner to prevent medium and large sized hogs from passing through any portion of the gate if unable to pass through the opening between the side rails 35 and 36.

The movement of movable side rail 36 relative to fixed side rail 35 is seen in FIG. 4 wherein the reciprocal direction of such movement is designated generally by arrow 50 and the inward position of side rail 36 is designated generally in phantom configuration by reference numeral 51.

A substantially flat rectangularly shaped door 55 is pivotally mounted by rod 56 secured to side edges of the door and projecting above the top edge of the door so as to be detachably engaged in hook members 57 secured to top horizontal member 21, the door being swingably suspended therefrom adjacent to the plane of the frame and being of a width such that the side edges 58 and 59 engage the side rails 36 and 35 respectively such that the door is only swingable in one direction with any attempt to push the door in the other direction effecting contact of the door with the side rails to prevent such opposite swinging movement of the door. The door is of a sufficient length between its top edge 60 and its bottom edge 61 such that a hog passing through the opening between side rails 35 and 36 must engage the bottom door edge to effect the swinging movement of the door in a manner to permit the hog to pass in the desired direction therethrough, with the door being returned by gravity to its vertically suspended position such that should any hogs desire to pass in the opposite direction between such side rails they are prevented from doing so by the presence of the door. Thus, a one-way type door is provided in a manner to permit smaller hogs of a size able to pass through the opening between the side rails 35 and 36 to pass from a first pen to a second pen while the door prevents any return of such hogs from the second pen into the first pen, and in this manner eventually only the larger sized hogs which cannot pass between the opening of the side rails are retained in the first pen and ready to be taken to market.

For ease in determining the width of the opening between side rails 35 and 36 there is provided on top member 21 marking indicia 70 in inches and which is used in conjunction with a pointer 71 on movable side rail 36 to indicate the distance between the adjacent most surfaces of side rails 35 and 36 and thus indicates the width of the opening therebetween.

A preferred manner of using the present invention would be to place the herd of hogs in a first pen with food and water for the hogs being placed in a second adjacent pen and with the sorting gate device 10 of the present invention disposed in the gateway interconnecting the first pen and the second pen. An individual would then select the desired width of the opening between the side rails 35 and 36 so as to retain hogs of a selected size and therefore a selected weight within the first pen and to permit smaller hogs to pass from the first pen into the second pen as they become hungry or thirsty, the door 55 prevents any return of the hogs from the second pen to the first pen after once passing therethrough. For example, a setting of about 9¾ inches for the width of the opening between the side rails 35 and 36 would allow any hog smaller than 215 pounds to pass therethrough from the first pen into the second pen such that eventually all those hogs larger than the selected size would be the only hogs left in the first pen and would then be ready to load for market.

It is to be appreciated that the hogs may perform this sorting operation over a period of time without fear of the size of the opening between side rails 35 and 36 being changed by hogs attempting to force their way therethrough as the threaded relationship between the shank 45 and the nut 44 is substantially non-reversible such that the selected position of adjustment will be maintained until altered by use of the handle 48.

Further, it is to be understood that the door 45 may be of an open type frame construction or the like as its sole requirement is to prevent hogs from passing in a reverse direction through the gate opening, and that to encourage hogs not to block the gate as well as to not attempt to force or manipulate the gate to pass therethrough in the reverse direction, that suitable electrical insulators and bare electrical conductors may be mounted thereto and connected to suitable electrical charging apparatus such that any hog contacting the back side of the door would first contact such rods and receive an electrical shock so that the hog would stay away from the door and the gate opening to permit free one-way passage of hogs through the gate.

It is to be understood that the form of this invention herewith shown and described is to be taken as a preferred example of the same, and that this invention is not to be limited to the exact arrangement of parts shown in the accompanying drawings or described in this specification as various changes in the details of construction as to shape, size, and arrangement of parts may be resorted to without departing from the spirit of the invention, the scope of the novel concepts thereof, or the scope of the sub-joined claims.

Having thus described the invention, what is claimed is:

1. A hog sorter gate device intended for the sorting, classifying, and separating of hogs according to size and therefore according to weight, the device in combination comprising:

a rectangular frame having a horizontal top member, a horizontal bottom member, and opposed vertical side members, the frame top and bottom members each formed of identical channel members having a U-shaped cross-section, said channels being disposed in confronting face-to-face relationship;

a fixed vertical side rail spaced inwardly from one of said side members and extending between said top and bottom members;

a movable vertically disposed side rail spaced inwardly from said opposite side member and disposed adjacent said fixed side rail and movable horizontally toward and away therefrom, said movable side rail having its opposite end portions in sliding engagement with said top and bottom channel members respectively for guided relationship therein;

a vertically extending fixed post disposed intermediate said movable side rail and said adjacent side member and having its opposite ends permanently secured to said top and bottom frame members respectively;

an opening extending diametrically through said fixed post approximately midway between said top and bottom members with said opening lying in the plane of said top and bottom members;

a tubular member disposed in axial alignment with said fixed post opening and having one end affixed to said movable side rail with the opposite end projecting outwardly therefrom and terminating a spaced distance from said fixed post;

a nut having a threaded bore disposed in axial alignment with said tubular member and permanently affixed thereto;

a threaded elongated cylindrical shaft member having a handle affixed to one end with the shaft extending through said fixed post opening and having its opposite end threadedly received in said nut, the threaded relationship between said shaft and said nut being substantially non-reversable such that the selected position of adjustment of said movable side rail will be maintained until altered by use of said handle even though hogs passing intermediate said fixed and movable side rail may exert high levels of force on said movable side rail;

the rotation of the shaft in either direction about its axis will effect movement of said movable side rail relative to said fixed side rail in opposite directions depending upon the direction of rotation of the shaft about its axis;

a graduated scale marked in inches disposed along a portion of said frame top member beginning adjacent said fixed side rail and extending in the direction of said movable side rail, and indicating the spacing in inches between said movable and fixed side rails;

a pointer member fixedly mounted on said movable side rail and overlapping a portion of said scale to indicate an exact measurement of the width of the opening defined between adjacent most surfaces of said movable and said fixed side rails;

a door member extending the full maximum width of the maximum width opening between said fixed and movable side rails and overlapping portions of said side rails along the door side edges;

a pair of horizontally spaced apart hook members mounted on said frame top member and projecting outwardly of the plane thereof;

rod members each having one end portion thereof pivotally attached to associated ones of said hook members with the opposite end portions thereof projecting outwardly therefrom and affixed to opposite side members of said door;

said door being swingable about said hook members between a vertical closed position engaging said side rails and an open position swung outwardly from said side rails thereby providing a one-way door swingable in a single direction only such that hogs of a size to pass between said side rails engage the bottom edge of said door to swing the same out of the way as the hogs pass therethrough with the door returning to said vertical closed position to prevent the hogs from passing in the opposite direction through the gate opening.

* * * * *